Patented Sept. 22, 1936

2,055,136

UNITED STATES PATENT OFFICE 2,055,136

PROCESS OF PRODUCING WHITE CYANID BY FUSION

Edward J. Pranke, Great Barrington, Mass., assignor to E. I. du Pont de Nemours & Company, Inc., a corporation of Delaware No Drawing. Application July 18, 1933, Serial No. 680,989. In Canada April 10, 1933

14 Claims. (Cl. 23—79)

This invention relates to the production of white alkali metal cyanid by fusion of alkali metal cyanid. The invention has for its object the provision of an improved cyanid product and of a novel and improved method of producing the same. The present application is a continuation in part of my copending application Serial No. 609,996, filed May 7, 1932.

Alkali metal cyanids, such as sodium cyanid, which for example have been prepared from aqueous solutions or which have come into contact with water which is subsequently removed by evaporation, upon being heated to slightly above the melting point (sodium cyanid 563° C.; potassium cyanid 635° C.) and cooled will have a dark color of varying intensity. This dark color is considered so objectionable commercially that cyanids prepared from aqueous solutions are briqueted at high pressures instead of being fused and cast.

I have found that a substantially white product can be obtained by heating the cyanid to a temperature considerably above the fusion point of the cyanid, avoiding too rapid cooling of the melt to temperatures near the solidification point, and then cooling to ordinary temperatures.

In practicing my invention I may, for example, proceed as follows: I may heat the dried cyanid, for example a cyanid from which water has been separated, to a temperature of about 1150 to 1250° C. I then allow the melt to cool preferably over a period of one-half minute to three or four minutes or more, to a temperature about 50 to 100 degrees above the point of solidification. I then pour it into molds in the usual manner.

While I prefer to heat the cyanid to a temperature of about 1200° C. at which temperature the decolorizing reaction is very rapid, and is usually completed within one to three minutes, the heating can be carried to somewhat lower temperatures by allowing a longer period of time for the reaction to take place, and in this connection I have found that each decrease in temperature of about 10° approximately doubled the time required for completing the decolorizing reaction. The minimum temperature to which the cyanid is to be heated I find to be that temperature at which, in the time provided, the free carbon present at just above the fusion point is effectively oxidized to carbon monoxid by the alkali cyanate, carbonate or other oxidizing substances present.

I believe the following to be the explanation of my results, although such explanation is not to be taken in a limiting sense.

Alkali cyanid that has been separated from water contains products formed by the reaction of cyanid with water. Upon heating slightly above the melting point of the cyanid, one or more of these products decomposes with the release of elementary carbon. Although the actual percentage of carbon is very small, it is sufficient to impart to the cooled product the objectionable dark color above referred to.

In cyanids of this nature there are usually present oxygen-containing impurities, such as cyanate and carbonate. Upon heating to a temperature at which carbon is actively oxidized by these impurities, these substances are reduced by carbon, producing carbon monoxide which escapes. Thus, I believe that by heating to such a temperature I effect the oxidation of the color-producing carbon by the oxygen-containing impurities associated with the cyanid.

If the oxidizing substances should not be present in quantity sufficient to oxidize the carbon or other color-producing substance, the deficiency is easily made up by introducing into the fused mass a small quantity of air or other oxidizing substance. I find, however, that this is usually unnecessary.

At the maximum temperature reached, the alkali cyanid itself is partially dissociated into alkali metal, carbon and nitrogen. Too rapid a chilling of the mass appears to leave this carbon in the free state and color the cooled product. I have found, however, that if the melt is allowed to cool slowly (that is, much more slowly than if poured immediately into a cold mold), to about 50° to 100° above the temperature of solidification, this carbon is chemically recombined—presumably with the alkali metal, forming white alkali carbid. I have found that an average cooling rate of approximately 200° to 400° per minute is satisfactory. After the temperature of the melt has been reduced to near the solidification point, the mass may be cooled at any convenient rate to ordinary temperatures, producting a white product.

While I have described a process by which I have obtained excellent results, it will be understood that those skilled in the art may vary the means without departing from the spirit of my invention.

What I claim is:

1. The process of producing substantially white alkali metal cyanid by fusion and cooling of an alkali metal cyanid from which water has been removed, which consists in heating the said cyanid to approximately 1200° C., and cooling relatively slowly to a temperature near but above the solidification point, and then cooling to ordinary temperatures.

2. The process of producing white alkali metal cyanid by fusion and cooling of an alkali metal cyanid from which water has been removed, which consists in heating the said cyanid to approximately 1200° C. in the presence of a substance having an oxidizing action at the said temperature, and cooling relatively slowly to a temperature near but above the solidification point, and then cooling to ordinary temperatures.

3. The process of producing white sodium cyanid by fusion and cooling of sodium cyanid from which water has been removed by evaporation, which consists in heating the said cyanid to approximately 1200° C., and cooling relatively slowly to a temperature near but above the solidification point, and then cooling to ordinary temperatures.

4. The process of producing white alkali metal cyanid by fusion and cooling of an alkali metal cyanid from which water has been removed, which consists in heating the said cyanid to approximately 1200° C., and cooling relatively slowly to a temperature approximately 50 to 100° above the solidification point, and then cooling to ordinary temperatures.

5. The process of producing white alkali metal cyanid by fusion and cooling of an alkali metal cyanid from which water has been removed by evaporation, which consists in heating the said cyanid to approximately 1200° C., cooling from the said temperature to about 100° above the solidification point in not less than thirty seconds, and then cooling to ordinary temperatures.

6. The process of producing white alkali metal cyanid by fusion and cooling of an alkali metal cyanid from which water has been removed, which consists in heating the said cyanid to a temperature of about 1150° to 1250° C., cooling relatively slowly to a temperature about 100° above the solidification point, and then cooling to ordinary temperatures.

7. The process of producing white alkali metal cyanid by fusion and cooling of an alkali metal cyanid from which water has been removed, which consists in heating the said cyanid to a temperature of about 1150° to 1250° C., cooling from the said temperature to a temperature about 100° above the solidification point in not less than thirty seconds, and then cooling to ordinary temperatures.

8. The process of producing substantially white fused alkali metal cyanid which comprises heating alkali metal cyanid to a temperature of approximately 1200° C. and then cooling relatively slowly to a temperature near but above the solidification point, and then cooling to ordinary temperatures.

9. The process of producing substantially white alkali metal cyanid by fusion and cooling which comprises heating alkali metal cyanid in the presence of a substance having an oxidizing action to a temperature between the fusion point and about 1250° C. to oxidize the free carbon present just above the fusion point, cooling at a rate not faster than about 400° C. per minute to a temperature near the solidification point, and then cooling to ordinary temperatures.

10. The process of producing substantially white alkali metal cyanid by fusion and cooling which comprises heating alkali metal cyanid to a temperature between the fusion point and about 1250° C. which is sufficient to oxidize substantially all the free carbon present just above the fusion point and cooling the melt at a rate not faster than about 400° C. per minute to a temperature approximately 50° to 100° C. above the solidification point.

11. The process of producing substantially white fused alkali metal cyanid which comprises heating alkali metal cyanid to a temperature between the fusion point and about 1250° C., which is sufficient to oxidize the free carbon present just above the fusion point and cooling relatively slowly to about 100° above the solidification point.

12. The process of producing substantially white alkali metal cyanid by fusion and cooling of an alkali metal cyanid from which water has been removed, which consists in heating the said cyanid to a temperature between the fusion point and about 1250° C. at which the free carbon present just above the fusion point is oxidized and cooling at a rate not faster than about 400° C. per minute to a temperature near the solidification point.

13. The process of producing substantially white fused alkali metal cyanid from which water has been removed which comprises heating the said cyanid to a temperature between the fusion point and about 1250° C. at which substantially all the free carbon present just above the fusion point is oxidized and relatively slowly cooling the melt from said temperature to a temperature near the solidification point.

14. The process of producing substantially white sodium cyanid by fusion and cooling of sodium cyanid from which water has been removed, which comprises heating the said cyanid to a temperature between the fusion point and about 1250° C. at which the free carbon present just above the fusion point is oxidized, cooling at a rate not faster than about 400° C. per minute to a temperature near but above the solidification point, and then cooling to ordinary temperatures.

EDWARD J. PRANKE.